United States Patent
Skalecki et al.

(10) Patent No.: US 8,817,798 B2
(45) Date of Patent: Aug. 26, 2014

(54) CONSTRAINING TOPOLOGY SIZE AND RECURSIVELY CALCULATING ROUTES IN LARGE NETWORKS

(75) Inventors: Darek Skalecki, Ottawa (CA); Gerard L Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 207 days.

(21) Appl. No.: 13/571,771

(22) Filed: Aug. 10, 2012

(65) Prior Publication Data

US 2014/0044008 A1    Feb. 13, 2014

(51) Int. Cl.
*H04L 12/28* (2006.01)
*H04L 12/24* (2006.01)
*H04L 12/56* (2006.01)

(52) U.S. Cl.
CPC ............. *H04L 41/12* (2013.01); *H04L 45/122* (2013.01); *H04L 45/123* (2013.01); *H04L 45/127* (2013.01); *H04L 45/124* (2013.01); *H04L 45/26* (2013.01)
USPC ............ 370/400; 370/254; 370/392; 370/393

(58) Field of Classification Search
CPC ..... H04L 45/127; H04L 41/12; H04L 45/122; H04L 45/123; H04L 45/124; H04L 45/20; H04L 45/026; H04L 45/04
USPC .................................. 370/254, 400, 392, 393
See application file for complete search history.

(56) References Cited

U.S. PATENT DOCUMENTS 8,213,409 B2 *   7/2012   Rudnick et al. ............... 370/351
2007/0299950 A1 *  12/2007   Kulkarni ....................... 709/223

* cited by examiner

*Primary Examiner* — Jason Mattis
*Assistant Examiner* — Kuo T Chiang
(74) *Attorney, Agent, or Firm* — Kent Daniels; Daniels IP Services Ltd (57) ABSTRACT

A method of managing a network comprising a plurality of nodes. Each node maintains a respective topology database containing topology information of the network within a local region of the node, the local region encompassing a subset of the plurality of nodes of the network. The nodes of the network implementing a Recursive Path Computation algorithm to compute end-to-end routes through the network.

14 Claims, 6 Drawing Sheets

CONSTRAINING TOPOLOGY SIZE AND RECURSIVELY CALCULATING ROUTES IN LARGE NETWORKS

CROSS-REFERENCE TO RELATED APPLICATIONS

This is the first application filed in respect of the present invention.

FIELD OF THE INVENTION

The present application relates generally to management of communications networks, and more specifically to techniques for constraining topology size and recursively calculating routes in large networks.

BACKGROUND

In a typical communications network, it is common practice to implement a network topology discovery protocol, which enables a node of the network to populate a respective topology database that may subsequently be used to compute routes through the network. One such network discovery protocol is Open Shortest Path First (OSPF), although there are others.

As is typical of network discovery protocols, OSPF defines various types of Link State Advertisement (LSA) messages, which may be flooded into the network by a node to convey network topology information to all of the other nodes in the network. Accordingly, a given node can use the information contained in received LSAs to populate and maintain its topology database.

In a full-mesh network, both the volume of LSA traffic and the size of the topology database increases with $N^2$, where N is the number of nodes. In a network domain in which there are a large number of nodes, LSA traffic may proliferate and require a very large topology database, both of which may degrade the topology discovery, route computation, and failure recovery functions of the network.

One method of mitigating this problem is to divide a network domain into two or more smaller sub-domains, which may then be connected via one or more designated gateway nodes. The gateway nodes may then implement a Border Gateway Protocol (BGP) to enable computation of routes that originate in one sub-domain and terminate in another. However, in some case this solution is undesirable. For example, a network operator may find the implementation and maintenance of BGP to be onerous or costly.

Another method would be to use External Network to Network Interfaces (E-NNIs) to interconnect sub-domains of a network domain, and utilize sub-domain abstractions to control the topology database sizes and proliferation of related LSAs. However, a network operator again may find the implementation and maintenance of E-NNIs and sub-domain abstractions to be onerous or costly.

Techniques that enable the LSA traffic volume and the size of the topology database to be constrained, while still enabling effective route computation through a network domain, remain highly desirable.

SUMMARY

An aspect of the present invention provides a method of managing a network comprising a plurality of nodes. Each node maintains a respective topology database containing topology information of the network within a local region of the node, the local region encompassing a subset of the plurality of nodes of the network. The nodes of the network implementing a Recursive Path Computation algorithm to compute end-to-end routes through the network;

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present application provides techniques for constraining LSA traffic volume and the size of the topology database, while still enabling effective route computation through a network domain.

In general terms, each node of the network may operate to populate and maintain a respective topology database that contains information of a local region encompassing a subset of the nodes of the network. For destination addresses lying within the local region of a node, routes may be computed by conventional means such as, for example, using Djykstra's algorithm. For destination addresses lying outside the local region of a node, a recursive path computation (RPC) may be used. This technique is described in further detail below by way of example embodiments in which Link State Advertisement (LSA) messages are used to convey link and node status information to nodes within the network. This technique is particularly suited to networks in which Open Shortest Path First (OSPF) and similar protocols are used for topology discovery and route computation. However, it will be appreciated that the present invention is not limited to such networks. Indeed, the present technique can be used in any network environment in which nodes are able to populate and maintain a topology database providing information of the network, and which may be used to compute paths through the network.

As may be appreciated, various techniques may be used to construct a topology database that is constrained to a local region that encompasses a subset of the nodes of the network. In the case of a network that uses OSPF LSAs for topology discovery, the conventional LSA flooding behaviour may be modified by constraining the number of hops through which an LSA may be forwarded. One way in which this can be accomplished is to modify the conventional LSA format to include a Time To Live (TTL) parameter that defines the number of hops. Accordingly, referring to FIG. 1, when a node receives an LSA message (at step S2), it uses the content of the LSA message in a conventional manner to update its topology database (step S4). The node then decrements the TTL parameter (Step S6), and then determines (Step S8) whether the LSA should be forwarded on to neighbouring nodes the network. In the illustrated embodiment, if the decremented TTL is greater than zero, the LSA is forwarded (Step S10) to neighbour nodes in a conventional manner. Otherwise, the algorithm terminates without forwarding the LSA.

Figure 1:
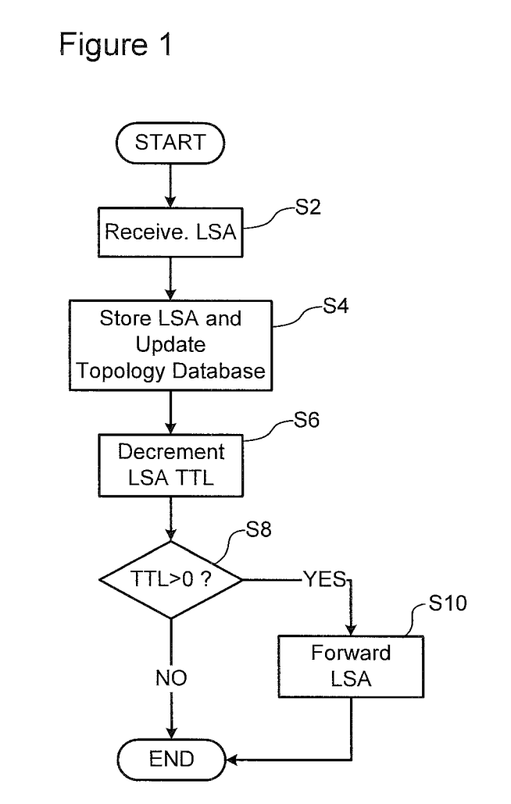
FIG. 1 is a flow chart illustrating a constrained Link State Advertisement algorithm.

Using the method of FIG. 1, the respective topology database of each node will contain topology information of links and nodes lying within N hops of the node, where N is the initial value of the TTL parameter assigned by the node that originates the LSA.

The portion of the network encompassed by a node's topology database may conveniently be referred to as the node's local "region", and nodes lying at the edge of that region may conveniently be designated as "boundary" nodes of that region. It will be appreciated that the designation of any given node as a boundary node is purely due to its lying at the edge of the portion (region) of the network that is visible to the node assigning that designation. It has no meaning in terms of the designated node's location or function within the network as a whole.

Figure 2:
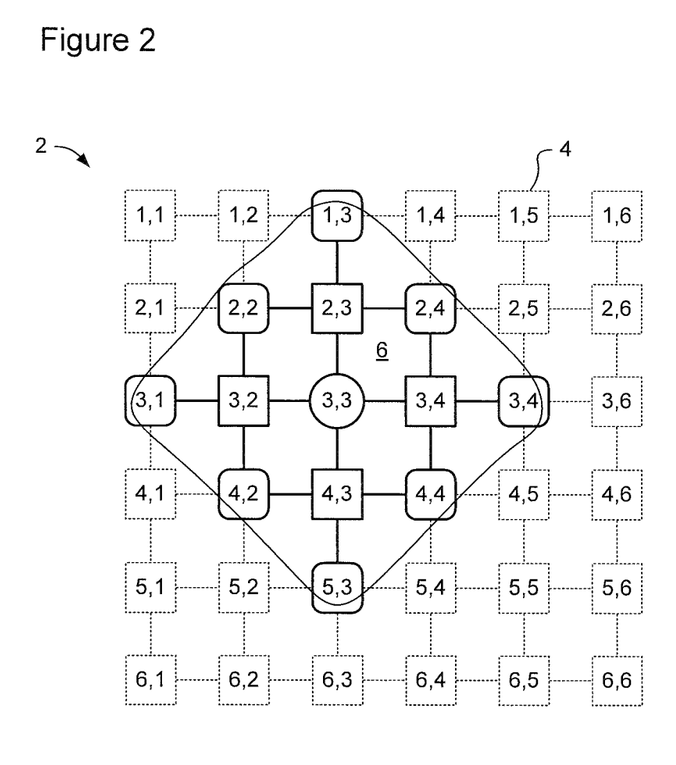
FIG. 2, is a block diagram illustrating a representative network in which methods of the present invention may be implemented.

FIG. 2 illustrates an example implemented in a network 2 comprising 36 nodes 4, connected in a rectangular mesh. In the example of FIG. 2 the local region 6 of node 3,3, for the case of N=2, is illustrated in solid lines. Nodes and links lying outside of Node 3,3's local region 6 are invisible to node 3,3, and so are shown in dashed lines. Nodes lying on the edge of node 3,3's local region (eg, nodes 1,3; 2,2; 2,4; 3,1; 3,4; 4,2; 4,4; and 5,3) are node 3,3's boundary nodes.

Figure 3:
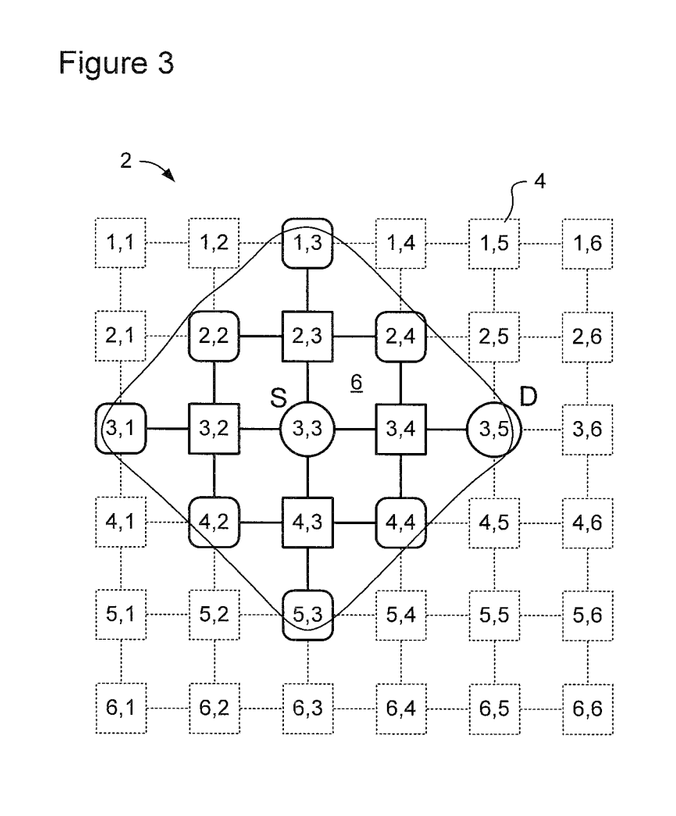
FIG. 3, is a block diagram illustrating an scenario in which a destination address lies within a local region of a source node.

As may be appreciated, node 3,3 has visibility to the links and nodes within its local region 6, and so can calculate routes to destination addresses within that local region using conventional methods. For example, FIG. 3 illustrates a scenario in which it is desired to compute a route from node 3,3 as the source (S) to a destination (D) at node 3,5. Because the destination lies within node 3,3's local region 6, conventional methods (such as Djykstra's algorithm) may be used to compute the shortest path (e.g. 3,3-3,4-3,5) between the source and the destination.

Figure 4:
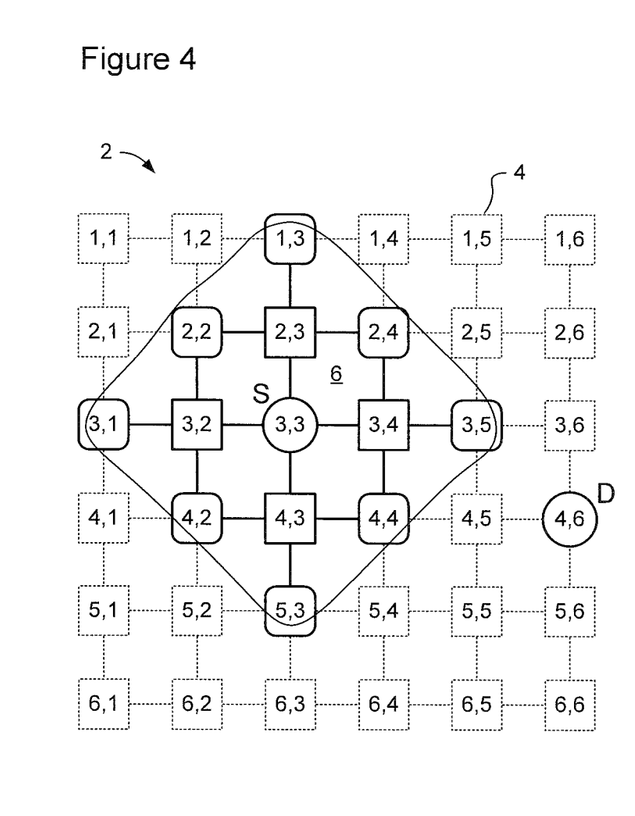
FIG. 4, is a block diagram illustrating an scenario in which a destination address lies outside a local region of a source node.

As may be seen in FIG. 4, conventional route computation will not work for destinations lying outside of node 3,3's local region 6, because node 3,3's topology database does not contain any information of links and nodes beyond its boundary nodes. Thus, for example, conventional methods cannot be used to compute a shortest path between node 3,3 as the source (S) to a destination (D) at node 4,6 which lies outside of node 3,3's local region 6. This problem may be overcome by implementing a Recursive Path Computation (RPC), as will be described below with reference to FIGS. 5A and 5B.

Figure 5A:
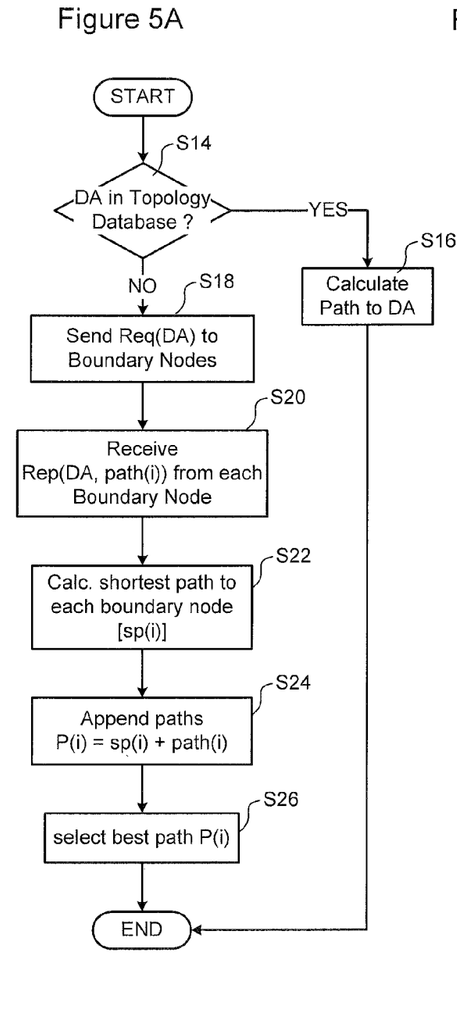
FIGS. 5A and 5B are flow charts illustrating a Recursive Path Computation (RPC) algorithm.

Referring to FIG. 5A, a representative algorithm that may be implemented in the source node begins with determining (step S14) whether or not the destination address (DA) is in the source node's topology database. If it is, then the scenario corresponds to the example of FIG. 3 described above, and conventional path computation methods may be used to compute the path to the destination (step S16). On the other hand, if the destination address (DA) is not in the source node's topology database, then the source node sends (step S18) a request message with the destination address to each of its boundary nodes. In the example of FIG. 4, source node 3,3 will send a request message containing D=4,6 as the destination address to each of its boundary nodes 1,3; 2,2; 2,4; 3,1; 3,4; 4,2; 4,4; and 5,3. For ease of illustration, in the flow chart of FIG. 5A, each boundary node is identified by an index (i).

Figure 5B:
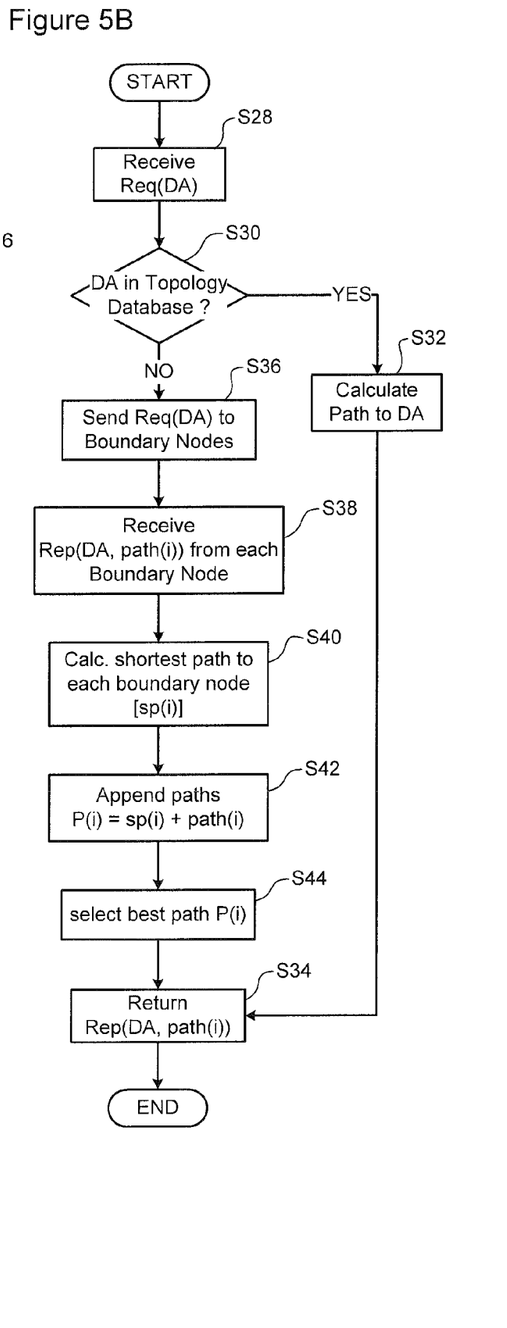
Figure 6:
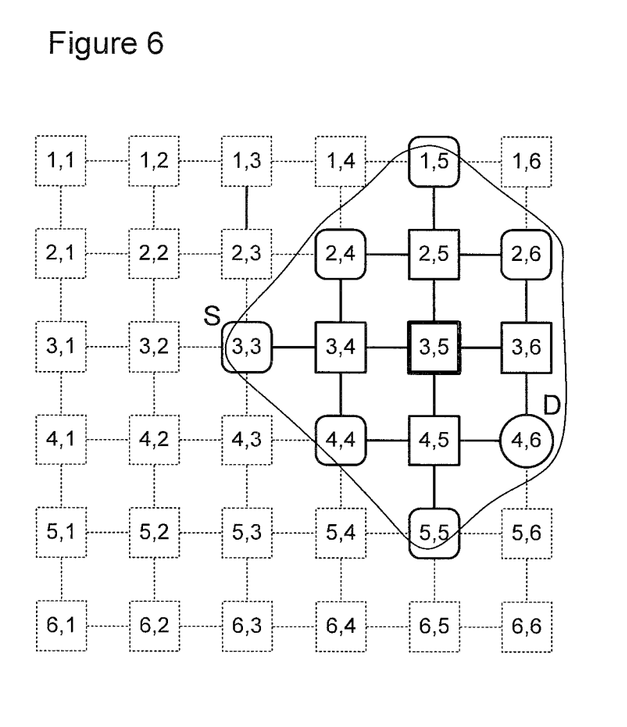
FIGS. 6-8 are block diagrams illustrating operation of the RPC of FIGS. 5A and 5B.
Figure 7:
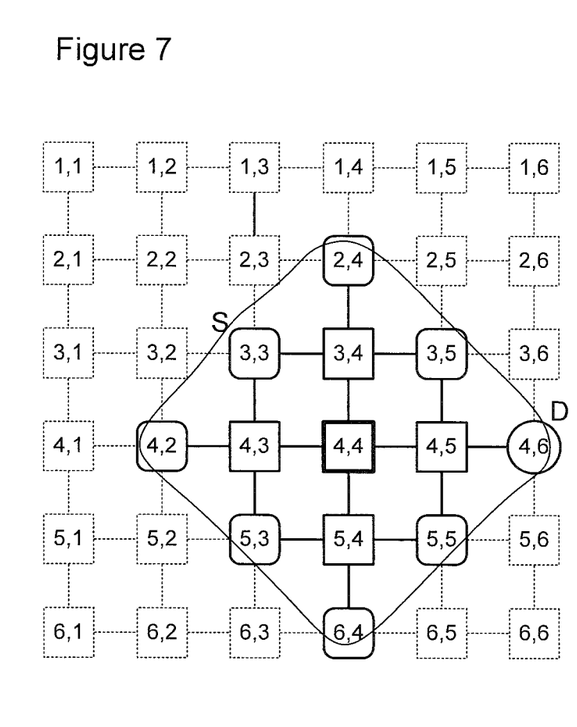

Referring to FIG. 5B, when a boundary node receives the request message (step S28), the boundary node determines (step S30) whether or not the destination address (DA) is in its own topology database (and so lies within that node's local region). If it is, then the node uses a conventional path computation technique to calculate the shortest path from itself to the destination address (step S32). The boundary node then returns the computed shortest path to the source node (step S34) in a reply message. For example, FIG. 6 shows the local region of node 3,5, which is one of the boundary nodes for source node 3,3. Accordingly, node 3,5 will receive a request message from source node 3,3 containing D=4,6 as the destination address. Upon receipt of the request message, node 3,5 will determine that the destination does lie within its local region (step S30), and so will compute a shortest path (eg 3,5-3,6-4,6) from itself to the destination using conventional methods. In a case where two or more shortest paths are possible, tie-breaking methods such as those known in the art may be used to select a preferred path. Node 3,5 then returns the shortest path (3,5-3,6-4,6) to the source node 3,3 in a reply message (step S34).

Referring back to FIG. 5A, upon receipt (step S20) of a respective reply message from one of its boundary nodes, the source node computes the shortest path sp(i) to the involved boundary node (step S22) using conventional methods, and appends it to the path information contained in the reply message (step S24) to yield the full path P(i) between the source node and the destination address via the involved boundary node. As respective reply messages from all of the boundary nodes are received and processed, the source node accumulates a set of complete paths to the destination address via each of its boundary nodes. From this set of complete paths, a single best path can be selected (step S26) based on any suitable criteria such as, for example, shortest path, least cost, bandwidth availability etc.) Thus, continuing the example of FIGS. 4-7, source node 3,3 receives a reply message from boundary node 3,5 containing path information (3,5-3,6-4,6) and appends it to the shortest path (3,3-3,4-3,5) between itself and boundary node 3,5; to yield a complete path (3,3-3,4-3,5-3,6-4,6) to the destination address via boundary node 3,5. Source node 3,3 also receives a reply from boundary node 4,4 containing path information (4,4-4,5-4,6) and appends it to the shortest path (3,3-3,4-4,4) between itself and boundary node 4,4 to yield a complete path (3,3-3,4-4,4-4,5-4,6) to the destination address via boundary node 4,4. Source node 3,3 can then use any suitable criteria to select the best one of these paths (e.g. 3,3-3,4-3,5-3,6-4,6).

As may be seen in the example of FIGS. 4-7, some of source node 3,3's boundary nodes (eg nodes 1,3, 2,2, 3,1 and 4,2) do not lie on any direct route to the destination. While these nodes may ultimately return a reply message to the source node 3,3 containing a valid path to the destination, there may be a substantial delay and any path they may find is unlikely to be selected by the source node. As such, the source node may implement any suitable method for limiting the time delay during which it will wait for reply messages and/or the number of reply messages that it will consider to select the best path. For example, in the grid-connected network of FIG. 4 with N=2, at most three boundary nodes are likely to be on a shortest path between the source node and any given destination node. In this case, the source node may operate to consider the first three reply messages that it receives, and discard any other reply messages.

Referring back to FIG. 5B, if the destination address (DA) is not in a boundary node's topology database, the boundary node sends a request message (step S36) to its boundary nodes; receives reply message (S38) computes the shortest path sp(i) to the involved boundary node (step S40) and appends it to the path information contained in the reply message (step S42) to yield the complete path P(i) between itself and the destination address via the involved boundary node; and finally selects the best complete path (step S44) to construct a path that can be returned to the source node in a reply message (at step S34). It will be appreciated that replication of this algorithm in each node of the network establishes a distributed Recursive Path Computation (RPC) process, by which a complete end-to-end path can be computed across the network and traversing any required number of local regions of the network.

In the embodiments described above, when a node determines that the destination address is not in its topology database, a request message containing the destination address is sent to each one of that node's boundary nodes. As may be appreciated, this can result in both proliferation and looping of request messages. For example, consider the scenario of FIG. 8, in which the source node 3,3 has sent a request message to it's boundary node 5,3 containing D=4,6 as the destination address. Since D=4,6 is not in node 5,3's topology database, it will send a request message containing D=4,6 as the destination address to each of its boundary nodes, which includes nodes 3,3, 4,2 and 4,4. However, node 3,3 is the source node, while nodes 4,2, and 4,4 are also boundary nodes for source node 3,3. As such, the sending and processing of request messages to these nodes is redundant and places an undesirable burden on the network. Various approaches may be used to limit this problem.

Figure 9:
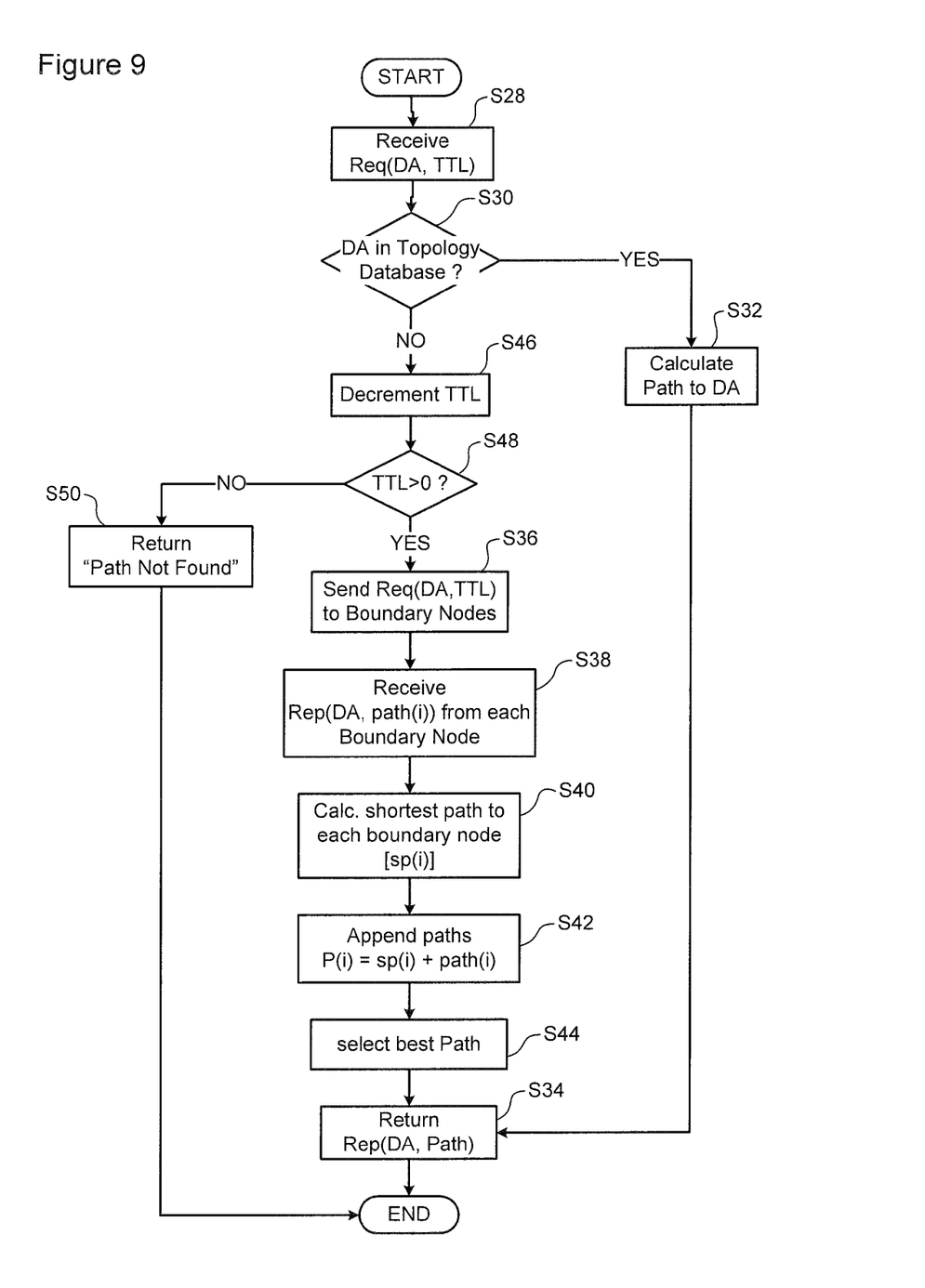
FIG. 9 is a flow chart illustrating a Recursive Path Computation (RPC) algorithm implementing a TTL function.

One approach, is to implement a Time-To-Live (TTL) function in respect of the request messages, similar to that described above with reference to the LSA messages. For example, FIG. 9 illustrates an algorithm similar to that of FIG. 5B, which has been modified to implement a TTL function. As may be seen in FIG. 9, the received request message (S28) contains a TTL parameter, which can be extracted and processed by the node. When it is determined (at step S30) that the destination address is not in the node's local topology database, the node decrements (at S46) the TTL parameter extracted from the request message, and then checks its value (at S48). If the decremented TTL value is equal to zero, then the process sends returns a "Path Not Found" message (at S50) to the node from which the request message was received. Otherwise, the node proceeds to send request messages (S36) and process reply messages to determine a best path (steps S38-S44) all as described above with reference to FIG. 5B. This process is modified only to incorporate the (decremented) TTL parameter in the request message sent to the boundary nodes in step S36. The TTL function illustrated in FIG. 9 would have the effect of limiting the number of iterations of the RPC before a node returns a response message containing a "Path Not Found" indication. In order to enable reliable end-to end path computation with this approach, the maximum LSA TTL, N, needs to be set to MAX(RoundUp(DIA/M), RoundUp(RAD)), where DIA is the diameter of the network (shortest path in terms of hops from farthest nodes in the network), M is the maximum number of permitted iterations of the RPC function (which corresponds with the initial value of the TTL parameter inserted into request messages sent by the source node to each of its local boundary nodes); and RAD is the radius of the network (shortest path in terms of hops from the middle of the network to the farthest node). For the illustrated network DIA=10 and RAD=5. In this case, if the maximum number of permitted iterations of the RPC function M=2, then the maximum LSA TTL, N=5.

Figure 8:
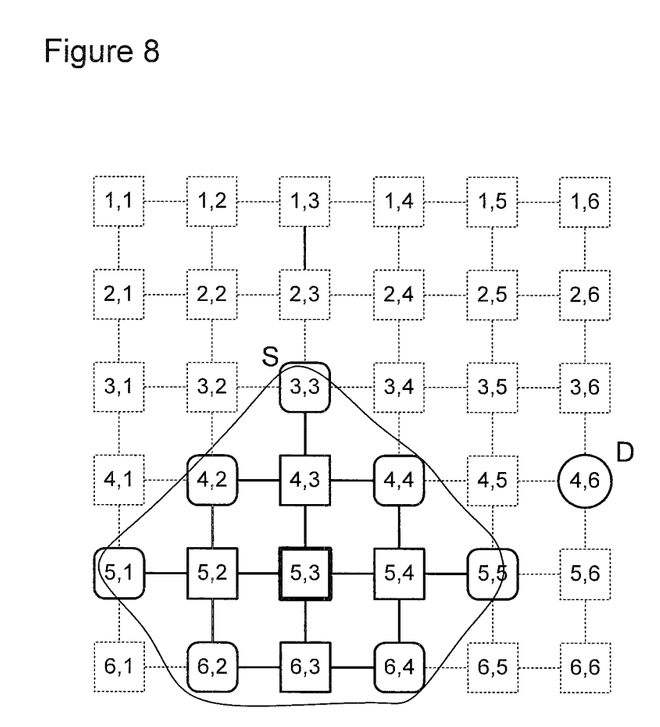

A second approach is to accumulate the identifiers of each node to which a request has been sent. In the example of FIG. 8, the request message send by source node 3,3 may include a list of each of node 3,3's boundary nodes. Upon receipt of the request message, node 5,3 executes the process of FIG. 5B, and upon determining that the destination address D=4,6 does not lie in its topology database, prepares a request message that will be sent to each of its (node 5,3's) boundary nodes except for any nodes identified in the request message received from node 3,3. The request message sent by node 5,3 also contains a listing of both the nodes identified in node 3,3's request, plus each of nodes to which node 5,3's request will be sent. By this means, unnecessary request message traffic can be avoided because each node can identify boundary nodes that have likely already received a request message from some other node.

In a third approach, the source node may assign a unique identifier to the path being set up from itself to the destination, and this path identifier can be included in the request messages being propagated through the network. In this case, when a node receives a request message from a given node, it can examine the path identifier and determine whether or not it has already received a request message relating to that path from a different node. If it has, then the request message can be treated as redundant, and discarded.

The above approaches may be used alone or in combination, as desired. In addition, other approaches will become apparent to those of ordinary skill in the art, and may be used, alone or in any suitable combination, without departing from the intended scope of the appended claims.

The embodiments of the invention described above are intended to be illustrative only. The scope of the invention is therefore intended to be limited solely by the scope of the appended claims.

We claim:

1. A method of managing a network comprising a plurality of nodes, the method comprising:

each node maintaining a respective topology database containing topology information of the network within a local region of the node, the local region encompassing a subset of the plurality of nodes of the network; and the nodes of the network implementing a Recursive Path Computation algorithm to compute end-to-end routes through the network;

wherein implementing a Recursive Path Computation algorithm comprises a first node performing the steps of:

determining whether a destination address is in a respective topology database of the first node;

when the destination address is not in the respective topology database of the first node:

sending a request message to each boundary node of the first node's local region, the request message containing the destination address;

receiving a respective reply message from at least one of the boundary nodes, each reply message including path information defining a path from the respective boundary node to the destination address;

for at least one received reply message, calculating a respective candidate path from the first node to the destination address via the respective boundary node; and selecting, from among the calculated candidate paths, a best path from the first node to the destination address.

2. The method of claim 1 wherein maintaining a respective topology database comprises:
   each node implementing a Link State Advertisement (LSA) messaging protocol to exchange topology information of the network, wherein LSA messages have a Time-To-Live (TTL) parameter limiting a maximum number of hops over which the LSA message can be propagated.

3. The method of claim 1 wherein calculating a respective candidate path comprises:
   calculating a shortest path from the first node to the respective boundary node; and
   appending the calculated shortest path to the path defined by the path information of the received reply message to define the respective candidate path.

4. The method of claim 1 wherein the step of calculating a respective candidate path is only performed for a subset of received reply messages.

5. The method of claim 4 wherein the subset of received reply messages comprises any one or more of:
   reply messages received within a predetermined delay period; and
   a predetermined number of earliest received reply messages.

6. The method of claim 1 further comprising:
   when the destination address is in the respective topology database of the first node, computing a shortest path between the first node and the destination address.

7. The method of claim 1 wherein the first node is a source node of a connection to be set up through the network to the destination address, and wherein the method further comprises setting up the connection using the selected best path.

8. The method of claim 1 wherein the first node is not a source node of a connection to be set up through the network to the destination address, and wherein the method further comprises the first node performing the steps of:
   receiving, from a second node, a request message containing the destination address; and
   sending, the to second node, a reply message containing path information defining the selected best path.

9. The method of claim 8, wherein the request message contains an identifier, and wherein the method further comprises the first node performing the step of:
   discarding the received request message if the identifier matches a respective identifier of a previously received request message.

10. The method of claim 9, wherein the identifier is a path identifier assigned by the source node.

11. The method of claim 8, wherein the request message contains a Time-To-Live (TTL) parameter for limiting a maximum number of iterations of the Recursive Path Computation.

12. The method of claim 8, wherein the request message contains a listing of nodes to which the request message has previously been sent, and wherein, when the destination address is not in the first node's topology database, the first node sends its request message to each boundary node of the first node's local region except those identified in the listing of nodes to which the request message has previously been sent.

13. A non-transitory computer-readable storage medium comprising software code for execution by a node of a network, the software code controlling the node to perform the steps of:
   maintaining a respective topology database containing topology information of the network within a local region of the node, the local region encompassing a subset of the plurality of nodes of the network; and
   implementing a Recursive Path Computation algorithm to compute end-to-end routes through the network;
   wherein implementing a Recursive Path Computation algorithm comprises a first node performing the steps of:
      determining whether a destination address is in a respective topology database of the first node;
      when the destination address is not in the respective topology database of the first node:
         sending a request message to each boundary node of the first node's local region, the request message containing the destination address;
         receiving a respective reply message from at least one of the boundary nodes, each reply message including path information defining a path from the respective boundary node to the destination address;
         for at least one received reply message, calculating a respective candidate path from the first node to the destination address via the respective boundary node; and
         selecting, from among the calculated candidate paths, a best path from the first node to the destination address.

14. A communications network comprising a plurality of nodes, wherein at least one of the nodes is operative to perform the steps of:
   maintaining a respective topology database containing topology information of the network within a local region of the node, the local region encompassing a subset of the plurality of nodes of the network; and
   implementing a Recursive Path Computation algorithm to compute end-to-end routes through the network;
   wherein implementing a Recursive Path Computation algorithm comprises a first node performing the steps of:
      determining whether a destination address is in a respective topology database of the first node;
      when the destination address is not in the respective topology database of the first node:
         sending a request message to each boundary node of the first node's local region, the request message containing the destination address;
         receiving a respective reply message from at least one of the boundary nodes, each reply message including path information defining a path from the respective boundary node to the destination address;
         for at least one received reply message, calculating a respective candidate path from the first node to the destination address via the respective boundary node; and
         selecting, from among the calculated candidate paths, a best path from the first node to the destination address.

* * * * *